United States Patent [19]
Aoki

[11] 3,803,842
[45] Apr. 16, 1974

[54] DEVICE FOR KEEPING METAL MOLD IN A CLAMPED STATE

[76] Inventor: Katashi Aoki, 6037, Oaza Minamijo, Nagano-ken, Japan

[22] Filed: Aug. 11, 1972

[21] Appl. No.: 279,906

Related U.S. Application Data

[62] Division of Ser. No. 145,385, May 20, 1971, Pat. No. 3,700,765.

[52] U.S. Cl.................... 60/416, 425/450, 91/415, 91/436
[51] Int. Cl............................................ F15b 15/17
[58] Field of Search .......... 425/247, 443, 450, 451; 164/157, 343; 264/328; 91/415, 436; 60/413, 416

[56] References Cited
UNITED STATES PATENTS

| | | | |
|---|---|---|---|
| 2,290,479 | 7/1942 | Mercier | 60/416 |
| 3,100,965 | 8/1963 | Blackburn | 60/413 X |
| 3,263,277 | 8/1966 | Ohlendorf et al | 164/343 X |
| 3,268,962 | 8/1966 | Roles | 164/343 X |
| 3,436,913 | 4/1969 | Muller et al | 60/416 X |

*Primary Examiner*—R. Spencer Annear

[57] ABSTRACT

A method and device for keeping metal mold in a clamped state characterized in that the mold-halves of the metal mold are respectively coupled to a plurality of hydraulic cylinders and pistons, the mold-halves are forced to close so that the displacement of the pistons causes a hydraulic fluid to flow from one space to the other in the hydraulic cylinders and also to an accumulator through a control valve, and upon the completion of the closure, shifting the control valve to another position so that the remaining fluid in the above mentioned one space is further evacuated to another accumulator at a low pressure with the simultaneous communication maintained between the other space of the hydraulic cylinders and the first accumulator, whereby a pressure difference is created between the two spaces separated by the pistons, and the mold-halves are thereby clamped.

1 Claim, 4 Drawing Figures

DEVICE FOR KEEPING METAL MOLD IN A CLAMPED STATE

This is a division, of application Ser. No. 145,385, filed May 20, 1971, now U.S. Pat. No. 3,700,765, dated Oct. 24, 1972.

This invention relates to a device for clamping metal mold used in the formation of synthetic resin and in the die-casting.

The metal mold provided in the conventional synthetic resin forming machine or the like has been so constructed that the both halves of the metal mold are respectively attached to a stationary plate and a movable plate of the mold clamping mechanism, the mold halves being closed by the outer force exerted to the movable plate, and are then clamped in the closed state.

Furthermore, a set of metal molds provided in the conventional rotary type forming machine have been mounted on a pair of upper and lower rotating plates provided in the mold clamping device, and are so constructed that the mold closure and clamping are attained by the outer force applied to the movable metal mold side although the metal mold can be shifted in its closed state.

In either of the above described cases, the metal mold or molds are always combined with the mold clamping device, and the metal molds cannot be clamped without the mold clamping device nor be kept in the clamped state without a pressing device acting on the metal molds from outside.

Therefore, a primary object of the present invention is to be provided a device for maintaining the metal molds in a clamped condition without the pressing device acting on the metal molds from outside.

Another object of the present invention is to provide a device for maintaining the metal mold in a clamped and pressurized condition while the metal mold filled with a synthetic resin or a die-casting material is shifted to a mold opening-or-closing device.

Still another object of the present invention is to provide a device for keeping the metal mold in a clamped and pressurized condition in such a manner that the opening of the metal mold is not possible unless a hydraulic pressure acting on the pistons in a plurality of hydraulic cylinders coupled to the metal mold is removed.

These and other objects of the present invention are achieved by a method for keeping the metal mold in a clamped and pressurized condition, which comprises the steps of preparing a plurality of hydraulic cylinders and pistons included therein to be coupled to the mold-halves respectively, forcing to close the mold for displacing the pistons in the hydraulic cylinders and shifting the hydraulic fluid from a space to another space in the cylinder and also to an accumulator, and shifting a control valve to another position for evacuating the hydraulic fluid remaining in one of the spaces to another accumulator at a low pressure and for causing a pressure difference acting on the pistons.

The objects can be achieved by a device as disclosed herein for practicing the above described method, comprising a plurality of hydraulic cylinders including pistons, a pair of base plates coupled to the hydraulic cylinders and the pistons respectively, a pair of mold-halves mounted on the confronting surfaces of the base plates, hydraulic oil paths for passing the hydraulic oil in one of the spaces in each of the hydraulic cylinders to the other under the action of the piston moved by an outer force and also to an accumulator, and a valve means for interrupting an oil path between the two spaces and evacuating remaining hydraulic fluid in said one of the spaces to another accumulator for creating a pressure difference exerted to the pistons.

The nature, principle, and utility of the present invention will be better understood from the following detailed description when read in conjunction with the accompanying drawings.

Figure 1:
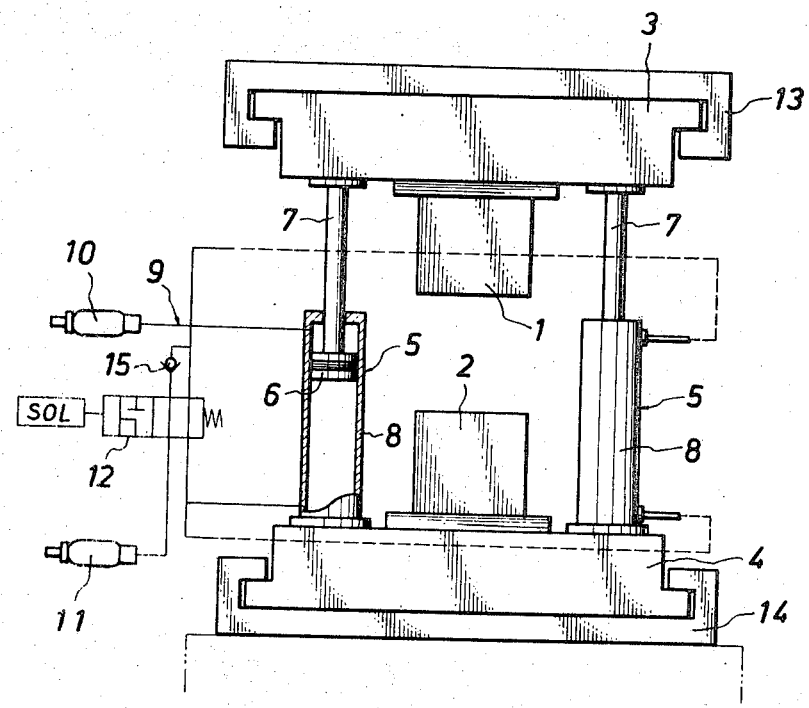
FIG. 1 is a front view, partially in section, of a device for keeping the metal mold in a clamped state, which constitutes an embodiment of the present invention.

In the drawings, a male mold-half 1 and a female mold-half 2 are respectively mounted on base plates 3 and 4. At four corners of the base plates 3 and 4, there are provided hydraulic cylinders 5, 5, . . . each including a piston 6 having a rod portion 7. The rod portions 7, 7, . . . are fixed to the base plate 3, and the hydraulic cylinders 5, 5, . . . are fixed to the base plate 4 at tube portions 8, 8, . . . of the hydraulic cylinders, so that the two mold-halves 1 and 2 may be thereby open-or-closed freely. The upper part and the lower part of the hydraulic cylinders 5, 5, . . . are connected to hydraulic oil paths 9 for flowing the operative oil caused by the displacement of the pistons 6, 6, . . . inside of the hydraulic cylinders 5, 5, . . . The hydraulic oil paths 9 are composed of a path portion communicating a bladder type accumulator 10 of high pressure to the higher space of the cylinder 5, 5, . . . , a path portion communicating said first path portion to another bladder type accumulator 11 of low pressure through a check valve 15 and a valve means 12, and a path portion communicating said first path portion to the lower space of the cylinder 5, 5, . . . through the valve means 12. Said bladder type accumulator 10 of high pressure stores one part of the operative fluid pushed out of the higher space of the cylinders 5, 5, . . . by means of the pistons 6, 6, . . . and supplies the operative fluid to the higher space of the cylinders 5, 5, . . . when it is desired. Another bladder type low pressure accumulator 11 evacuates a part of the operative fluid from the lower space in each of the hydraulic cylinders 5, 5, . . . and thereby reduces the pressure in the lower space of the cylinder 5, 5, . . . . The valve means 12 may be transferred between a first position and a second position for controlling the flow of the operative fluid. In the drawings, numerals 13 and 14 designate open-or-closing members for the metal mold.

The operation of the device will now be explained.

Figure 2:
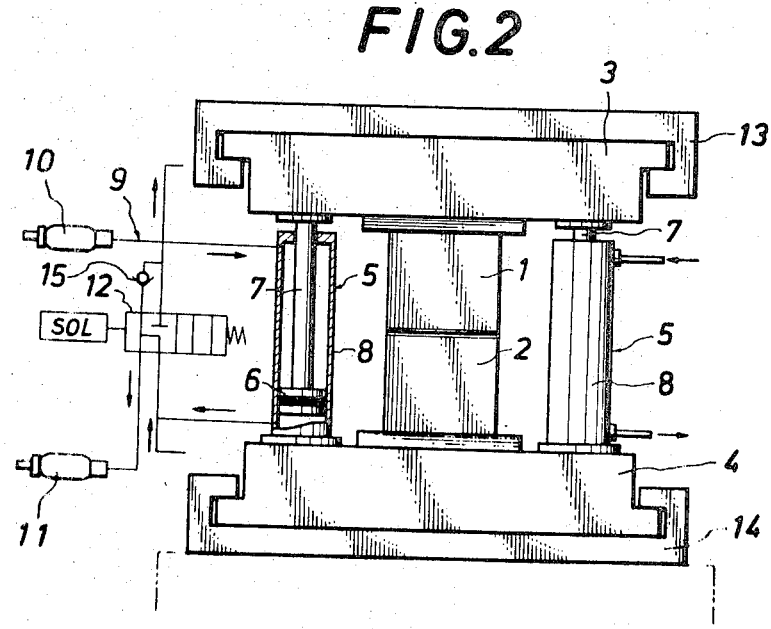
FIG. 2 is a view similar to FIG. 1 of the same device wherein the metal mold is closed.
Figure 3:
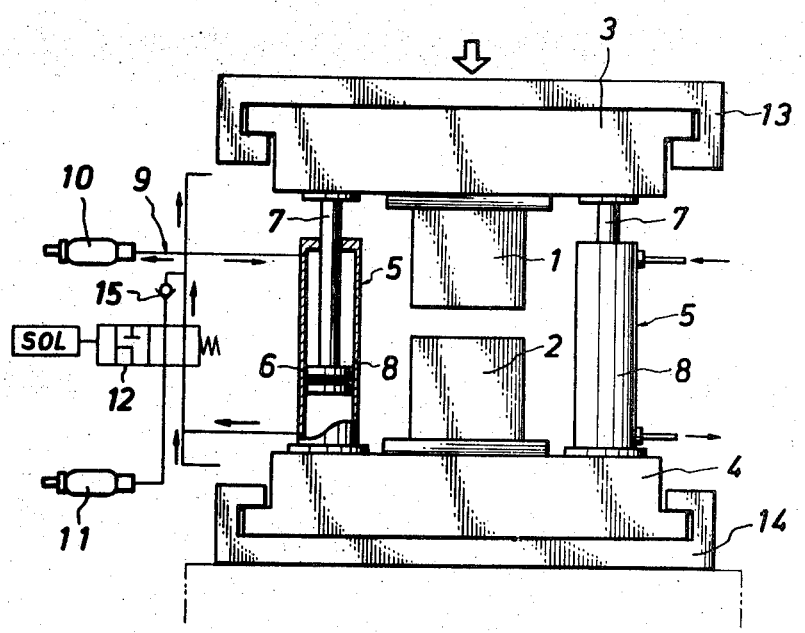
FIG. 3 is a partial view of the same device wherein the metal mold is going to be closed.

When it is desired that a pair of mold-halves opened by pulling the base plate 3 upwardly by means of the mold opening-or-closing device 13 as shown in FIG. 1 are closed as shown in FIG. 2 into a pressurized condition, the valve means 12 of the hydraulic oil paths 9 is shifted to its "pass-through" position as shown in FIG. 3 and forces the male mold-half 1 on the base plate 3 down to the other mold-half 2 on the base plate 4. Depending on the movement of the base plate 3, the pistons 6, 6, . . . are moved inside of the tubes 8, 8, . . . of the hydraulic cylinders 5, 5, . . . downwardly, and the operative fluid in the lower space of the hydraulic cylinders 5, 5, . . . is pushed out of the cylinders to the upper space of the same hydraulic cylinders and also to the accumulator 10 through the valve means 12 placed at its pass-through position. In this case, the amount of the fluid passed into the accumulator 10 corresponds to the difference of the volumes of the fluid pushed out of the lower space of the hydraulic cylinder and of the fluid introduced into the upper space of the same cylinder because of the existence of the piston rod 7. As a result the pressure in the accumulator 10 is elevated.

When the base plate 3 is fully descended so that the male mold-half 1 engages the female mold-half 2 on the base plate 4, there is no recognizable pressure difference between the upper space and the lower space of the hydraulic cylinder 5 separated by the piston 6, and since the valve means 12 is in the pass-through position (hereinafter called the first position), the mold-halves may be easily opened if an outer force is exerted on the base plate 3 upwardly as indicated by an arrow mark in FIG. 4.

In order to keep the mold-halves in a clamped and pressurized condition, the valve means 12 is transferred to a "one port blocking" position (hereinafter called the second position), as shown in FIG. 2. As a result, the hydraulic fluid remaining in the lower space of the hydraulic cylinders 5, 5, . . . is communicated to the accumulator 11, whereby the pressure in the lower space is decreased to a lower value. However, the upper space of the hydraulic cylinders 5, 5, . . . is still communicated with the accumulator 10 at a high pressure, and for this reason, a pressure difference is created between the upper space and the lower space of the hydraulic cylinders 5, 5, . . . which urges the pistons 6, 6, . . . downwardly. By this way, the metal mold-halves 1 and 2 are firmly clamped, and any application of outer force cannot open the mold-halves.

Figure 4:
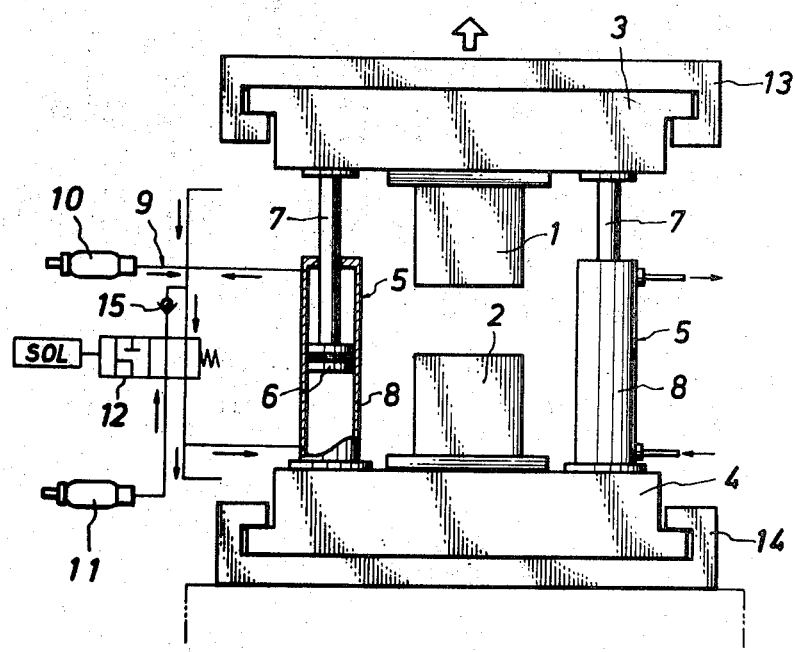
FIG. 4 is a partial view of the same device wherein the metal mold is going to be opened.

When it is desired to open the metal mold, the valve means 12 is shifted back to its original position as shown in FIG. 4. Thus the pressure difference between the upper and lower spaces of the hydraulic cylinders 5, 5, . . . is eliminated, and the metal mold-halves can be easily opened by raising the base plate 3 upwardly, for instance, by means of the mold opening-or-closing device. In that case, the hydraulic fluid in the upper space of the hydraulic cylinders 5, 5, . . . can be shifted back to the lower space thereof through the valve means 12 at the pass-through position. During the above described procedure, the hydraulic fluid stored in the accumulators 10 and 11 is passed into the lower space of the hydraulic cylinders 5, 5, . . . under the suction caused by the rising pistons 6, 6, . . . whereby the whole system is brought back to its initial condition as shown in FIG. 1.

According to the present invention, since the metal mold thus closed is further clamped employing a plurality of hydraulic cylinders coupled to the mold-halves in a freely openable and closable manner, the metal mold can be maintained in the clamped state even after the metal mold is removed from the injection molding machine, and the metal mold can withstand the inner pressure caused by the synthetic resin filled inside of the metal mold because of the oil pressure inside of the hydraulic cylinders which can be removed only by shifting the control valve means to another position.

Furthermore, the device is constructed simply by coupling the hydraulic cylinders to the mold-halves so that the mold-halves can be freely open-or-closed through the operation of the hydraulic cylinders, and the transportation of the device is also very easy. For this reason, it is apparent that the method and the device according to the present invention can afford various advantageous features such as enabling the transportation molding which has been difficult in the conventional apparatus.

What is claimed is:

1. In a device for keeping a metal mold in a clamped state:
   A. a hydraulic cylinder including:
      i. a piston slidable therein;
      ii. a piston rod connected to said piston and extending out from said cylinder;
      iii. said piston dividing said hydraulic cylinder into two oil chambers;
   B. a first hydraulic line communicating said two chambers;
   C. a high pressure accumulator;
   D. a second hydraulic line communicating said first hydraulic line to said high pressure accumulator adapted for temporary storage of excessive hydraulic fluid;
   E. a low pressure accumulator;
   F. a third hydraulic line communicating said first hydraulic line and said low pressure accumulator adapted for storing a part of said hydraulic fluid for creating a pressure difference on opposite sides of said piston;
   G. a check valve in said third hydraulic line; and
   H. hydraulic path establishing means including a control valve connected in said first and third hydraulic lines operable to selectively open and close said first hydraulic line.

* * * * *